Feb. 9, 1960 R. D. CLEMSON 2,924,055
POWER MOWER HAVING DRIVE CONTROLLED BY MOWER HANDLE
Filed Feb. 17, 1955 7 Sheets-Sheet 1

INVENTOR
Richard D. Clemson
BY
Curtis Morris & Safford
ATTORNEYS Feb. 9, 1960 R. D. CLEMSON 2,924,055
POWER MOWER HAVING DRIVE CONTROLLED BY MOWER HANDLE
Filed Feb. 17, 1955 7 Sheets-Sheet 7

INVENTOR
Richard D. Clemson
BY
Curtis Morris + Safford
ATTORNEYS

United States Patent Office 2,924,055
Patented Feb. 9, 1960

2,924,055
POWER MOWER HAVING DRIVE CONTROLLED BY MOWER HANDLE

Richard D. Clemson, Middletown, N.Y., assignor to Clemson Bros., Inc., Middletown, N.Y.

Application February 17, 1955, Serial No. 488,905

5 Claims. (Cl. 56—26)

This invention relates to power lawn mowers, and particularly to power mowers for home use wherein the driving power which is applied to the ground wheels is controlled by motions of the handle; and to protective and adjusting devices therefor.

Power lawn mowers for such use have generally comprised a motor mounted on a conventional lawn mower frame and connected to the cutter reel, and also connected through a clutch to the ground wheels. Overrunning clutches or differential gears have been used to allow for different wheel speeds when turning. A throttle, together with some form of clutch control for disconnecting the power drive, are usually mounted on the handle.

As is well known, power mowers of this type are difficult to operate and steer around obstructions, borders, etc., and tend to force the operator to move at a pace which may be very tiring. As the power drive is constant while the clutch is engaged, steering on a turn requires the operator to race around the mower on an arc of considerable radius because of the length of the handle, or to tip the whole mower back on its ground roller and work it back and forth, gaining a little turn at each reverse movement. Because such mowers are cumbersome, close trimming around trees, flower beds, buildings, etc., is accomplished with difficulty.

It is accordingly a primary object of the present invention to provide a power mower which is highly responsive, requiring little physical effort and allowing the operator to maneuver in close proximity to trees, borders, etc., in an easy and natural manner.

It is another object of the present invention to provide a power mower that is controlled in operation almost entirely by a servo action, i.e., the same movements are required as with the hand mower but with no need to actually push or drive the mower by hand pressure.

Another object is to provide effective and simple means to prevent grass, weeds, etc., from winding up on the reel shaft.

A further object is to provide for quick and accurate cutting height adjustment.

Another object is to provide in a mower of the type described effective means to prevent damage by stalling the fly blades of the machine on sticks and stones or other obstructions.

Other objects will be in part obvious and in part pointed out hereafter.

In an earlier copending application, now Patent No. 2,818,699, dated January 7, 1958, I have shown a power mower with means, comprising a clutch for the reel drive and individual clutches for driving each of the ground wheels independently of one another; thereby attaining highly responsive steering, with power drive on both wheels regulated so that the outer wheel on a turn is driven more than the inner wheel. In the present mower, power steering is not applied on both wheels during the turn, and is not affected by driving the outer wheel faster; but nearly equal facility of handling is provided, in a more simple and economical manner.

The new mower uses the handle 56 of my Patent No. 2,624,168, which is readily and immediately detachable like the handle of the patent by springing the ends 57 of the fork so as to clear one of the pivot studs 133'. (See also Figure 15.) The only additional operation necessary for removing the handle from the power mower is releasing the detachable clamp 52 which carries the throttle control lever 58 and control wire 59. This quick, easy detachment of the handle gives facility in carrying the mower from place to place and for storage. Novel features of the handle 56, as relating to provision of parts for controlling the operation of the clutch 40, will be described herein in connection with the operation of said clutch.

The frame parts and housings are designated generally on the drawings by the reference character 10. Manual steering is accomplished and controlled almost as easily as with the power steering of my earlier construction, because in the present mower, a novel combination of drive-disconnecting clutch and overrunning clutches is included in the propulsion mechanism. This mower has a propulsion clutch which, like those of my said earlier application, is disengaged by a pull of the handle and engaged when the handle is allowed to go forward; but in the present mower one such clutch disconnects or engages both wheels simultaneously, as the single propulsion clutch is positioned between the motor and the drive pinions for the ring gears in the wheels. These pinions 78 are provided with overrunning clutches, which may be shuttle pin clutches 74 such as are used in most hand mowers. These pinions 78 may be precision steel or bronze castings, or molded of rigid nylon or sintered bronze powder oil filled (so-called "Oilite" bronze) to give both quieter operation and freedom from lubrication troubles.

Figures 1, 2:
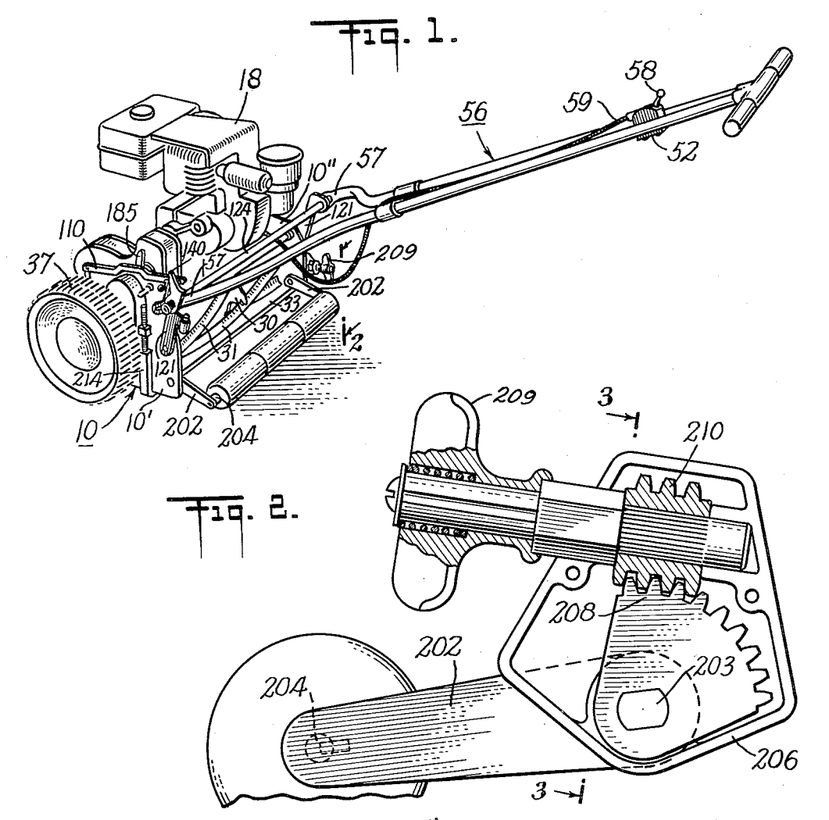
Fig. 1 is a side and rear perspective view of a mower embodying features of my invention with the handle and clutch controlling parts in normal inactive position.
Fig. 2 is an enlarged partial side view and section taken approximately on line 2—2 of Fig. 1, showing the novel height adjustment.
Figures 4, 5, 5A:
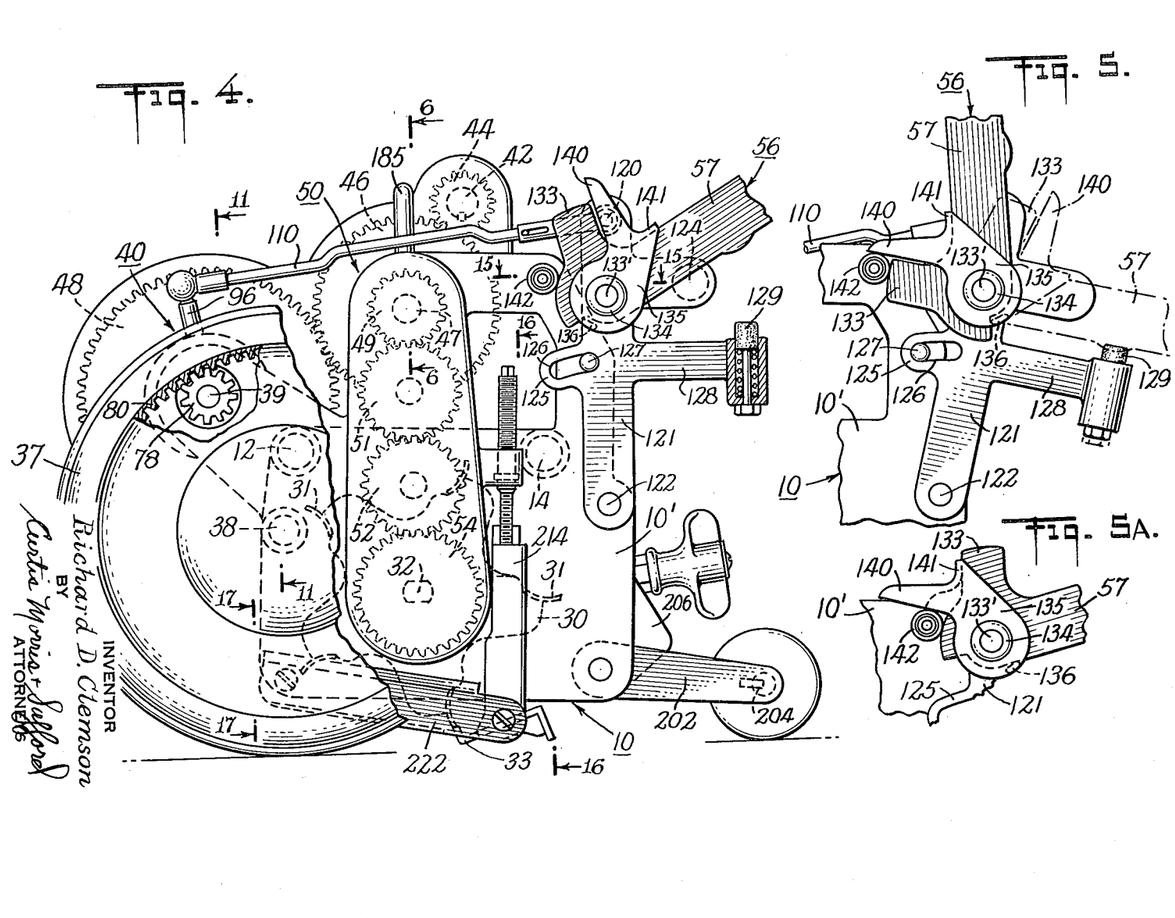
Fig. 4 is a view, shown on enlarged scale and with parts broken away, of the near side of the mower as seen in Fig. 1, with the handle and its supporting lever in normal operating position.
Fig. 5 is a detail view on the same enlarged scale as Figure 4 showing the yoke or forked end of the handle and associated parts which serve to actuate the propulsion clutch, with the handle in raised or parking position shown in solid lines and in dropped position in broken lines, in both of which positions the mower is inactive.
Fig. 5A is a detail view similar to Fig. 5, but showing the detent in position to lift the frame by raising the handle.
Figure 18:
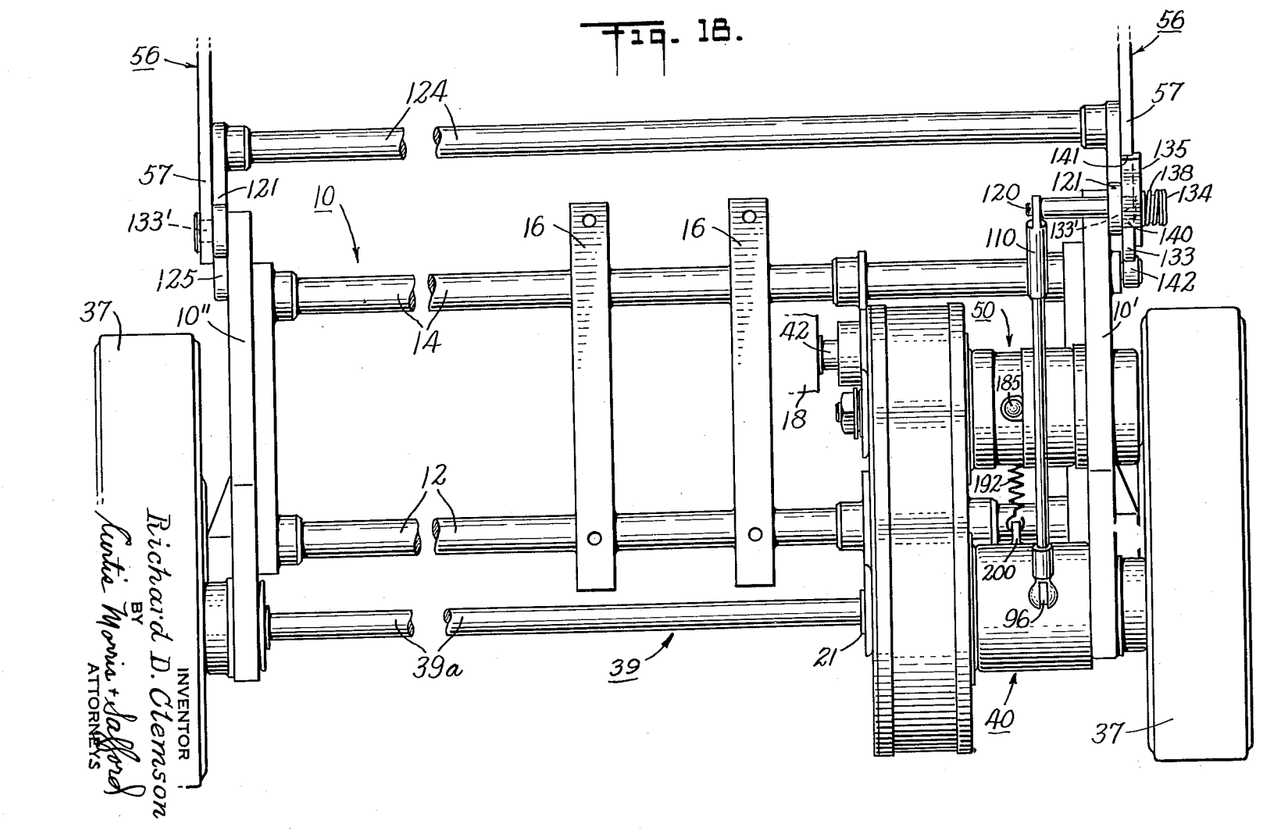
Fig. 18 is an enlarged fragmentary plane view showing the mower frame.

Referring now to Figs. 1, 4 and 18, a mower frame 10 comprises a pair of side frames 10' and 10" rigidly held in spaced parallel relation by tie tubes 12 and 14, as by welding or die casting. A pair of motor mounts 16 are secured on said tubes to carry the motor 18. Adjustably mounted on the frames 10' and 10" is the bed knife 33 and the cooperating reel 30, having its reel shaft 32 rotatably mounted in the side frames. The fly knives 31 of the reel are shown concave in cross section and with spiral twist.

Ground wheels 37 are mounted on axles 38 secured rigidly in the frames 10' and 10" forwardly of the reel. A drive shaft 39 supplies driving torque for wheels 37. This shaft extends through, and is splined for slidable engagement with, the sliding part of a propulsion disc clutch 40 (see Figs. 9 and 11). Thus, power transmitted from the disc clutch structure 40 may be imparted to both wheels simultaneously through shaft 39, a pair of overrunning clutches 74, drive pinions 78 and ring gears 80.

A motor gear pinion 44 (Figs. 4, 6 and 8), driven by motor shaft 42, engages a gear 46 rotatably mounted on clutch hub parts at one end of a countershaft 47. This gear 46 meshes with a gear 48, the driving member of propulsion clutch 40, and through the clutch 40, as said above, rotates the propulsion shaft 39 and, by means of overrunning clutches 74, the pinion gears 78, which when rotated in a forward direction cause forward rotation of the ground wheels.

In order to drive the cutting reel, at the other end of the countershaft 47 (see Fig. 6) is a pinion 49, driven from the gear 46 by means of a reel-driving clutch 50. Gear 46 constitutes the driving member of the assembly of Fig. 4 and Fig. 6 during clutch engagement. The pinion gear 49, by means of a train of idler gears 51 and 52, drives the gear 54 rigidly mounted on the reel shaft 32.

Suitable gear sizes are chosen throughout to give proper speed reduction, respectively, to the reel and to the ground wheels.

Figures 9, 10:
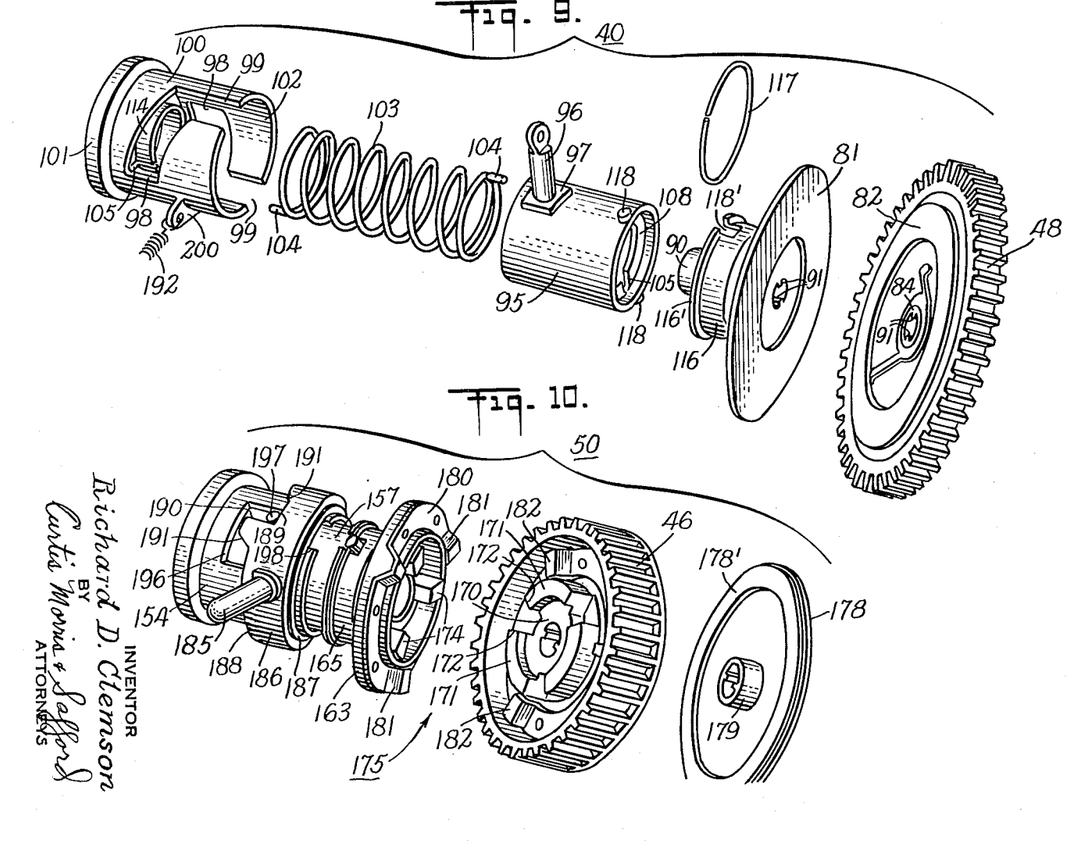
Fig. 9 is an exploded perspective view of the propulsion clutch shown in Fig. 11.
Fig. 10 is a similar view of the countershaft reel-driving clutch shown in Fig. 6.
Figures 11, 12, 13:
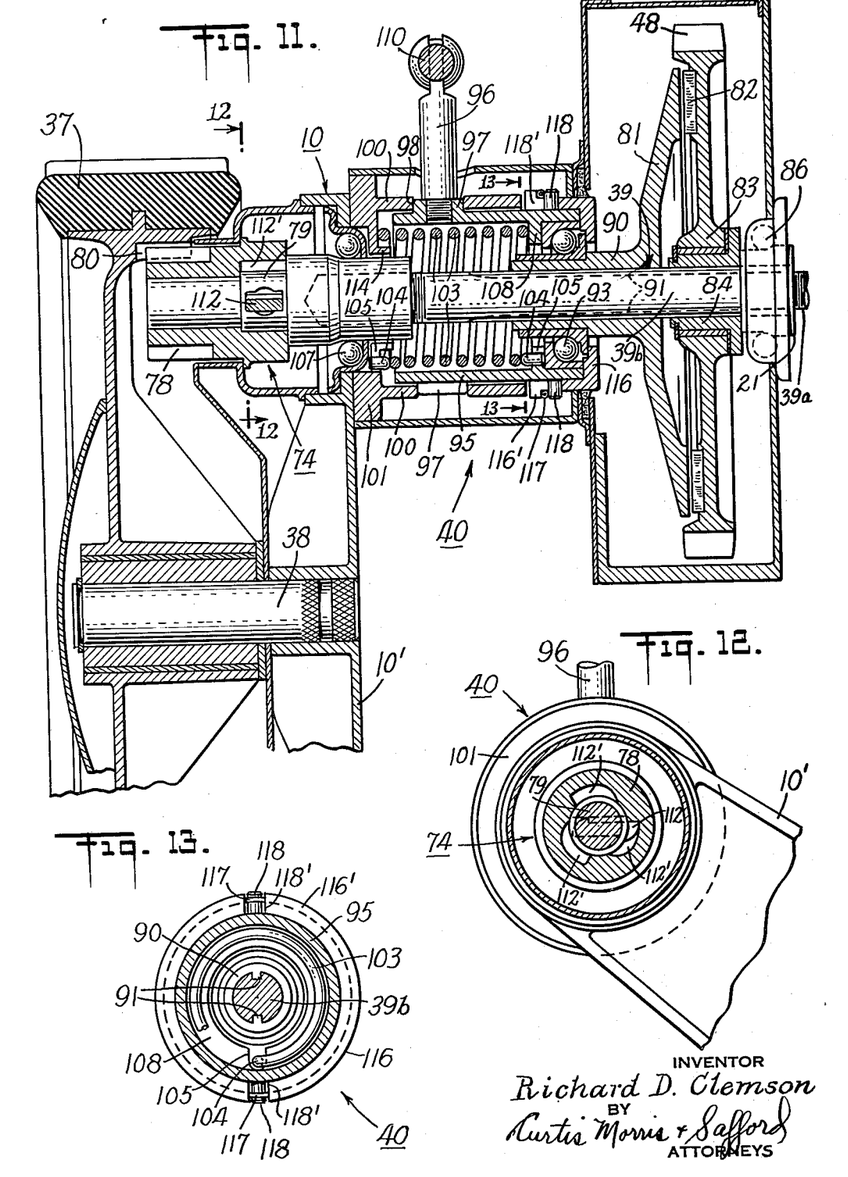
Fig. 11 is a vertical sectional view, shown on enlarged scale, this section being taken through the wheel and propulsion clutch taken on line 11—11 of Fig. 4.
Fig. 12 is a section taken on line 12—12 of Fig. 11.
Fig. 13 is a section taken on line 13—13 of Fig. 11.

Fig. 11 shows in sectional detail the propulsion clutch structure 40 and its operative (but disengaged) relationship with the ground wheel 37 on the left side of the mount; and Fig. 9 shows the relation of the parts of the clutch 40 by an exploded perspective detail view. The ring gears 80 in the wheels may be driven in the forward direction by the pinions 78, the shuttle pin clutch 74, the propulsion shaft 39, the clutch 40, and the gear train 44, 46 and 48.

As seen in Fig. 11, the clutch unit comprises the freely rotatable gear 48, which advantageously has rigid nylon teeth and a cast metal hub 83 mounted on a sleeve 84 which, when clutch is disengaged, provides a bearing for free rotation of the gear in spite of the key or splines 91 in the shaft 39 by which it engages clutch disc 81 and sleeve 84.

The shaft 39, adjacent the gear 48, is mounted on a frame-supported ball bearing 86. The inner face of gear 48 is provided with a clutch face 82, which, as shown, may be a friction facing engaged by the clutch disc 81. The hub 90 of the disc member 81 is keyed at 91 to the splined shaft 39, and is slidable longitudinally thereon to effect engagement.

The propulsion clutch 40 is operated by a short lever 96 extending from one of opposite cam bosses 97 in a sleeve 95 which is fitted for relative movement, both rotatably and axially, in an outer sleeve 100.

Cam slots 98 and 99 confine and direct the movement of the bosses 97, as will be seen by reference to Fig. 9. The slots 98 start, respectively, at opposite points in the wall of the sleeve 100 and extend spirally. Slots 99 communicate with slots 98 and extend longitudinally of the sleeve to its open end 102.

The end 101 of the sleeve 100 is rigidly mounted on the frame 10, as shown in Figure 11, in position around a cone-type ball bearing 107 in frame 10. This bearing 107 serves as a shaft bearing for the outer end part 79 of shaft 39 and also to take the thrust of clutch spring 103.

As shown in Figures 11 and 18 the wheel-driving shaft 39 is composed of separable parts 39a and 39b threaded together. This threaded joint secures the washer 21, shown at the extreme right in Figure 11, against which the thrust of the clutch 40 is imposed. By unscrewing, the parts of the shaft 39 can be removed from the frame laterally.

The shuttle pin 112 (Fig. 12) couples the end part 79 of shaft 39 to the pinion 78 by engaging chordal faces of the recesses 112' in the interval cloverleaf cam of pinions 78.

An inturned flange 114 on the outer end 101 of clutch 40 and an interior flange 108 on the opposite end of sleeve 95 are slotted at 105, respectively, to engage the ends 104 of the coil spring 103 (Figs. 11 and 13).

During assembly, cap 116 is slipped over the end of sleeve 95 and secured thereto by means of a retaining ring 117 which is snapped in place between cap flange 116' and the lugs 118 (Figs. 9 and 11), of sleeve 95 located within the recesses 118' of cap 116.

With the clutch completely assembled, the lugs 97 engage the edges of slots 98, having first passed lengthwise through the slots 99 with compression of spring 103 when sleeve 95 was inserted into sleeve 100, and then laterally into the spiral slots 98. In this position, the reaction of the spring pushes disc 81 into engagement with gear 48. To release the clutch, it is necessary to rotate the sleeve 95 to cam the lugs 97 on the sloping edges of slots 98. This is accomplished by a pull on the short lever 96. The resulting rotation of sleeve 95, relative to sleeve 100 cams the lugs 97 to the near ends of the slots 98. Thus, the sleeve 95 is drawn back and the engagement pressure taken off the clutch thrust bearing 93. Thus, the lever 96, bosses 97 and the slots 98 form actuating means for releasing the engagement pressure of the propulsion clutch 40.

Referring to Figs. 4, 11 and 18, it will be seen that the lever 96 on the sleeve 95 is connected by linkage means comprising a link 110 with a pin 120 mounted at the upper end of one of a pair of swing levers 121 (see also Figs. 1, 4 and 5) on which the mower handle 56 is pivotally mounted. Each swing lever 121 is pivoted at 122 upon the side frames 10'—10", and said levers are rigidly tied together by strut 124 in the form of a U-shaped yoke. Thus a push or pull on the handle 56 acts through link 110 to engage or disengage the clutch 40. Thus, the swing levers 121 and strut 124 form mounting means for the handle 56 permitting movement thereof to various mower operating active and inactive positions.

Each swing lever 121 is provided with a forward extension 125 having a slot 126, adapted to fit over a pin 127, on the frame members 10, to limit swinging of the levers 121. Each lever has a rearward extension 128 fitted with an upstanding bumper 129 which engages the handle 56 when it is dropped. Cam-shaped members 133 are provided on the ends of handle 56.

Figure 15:
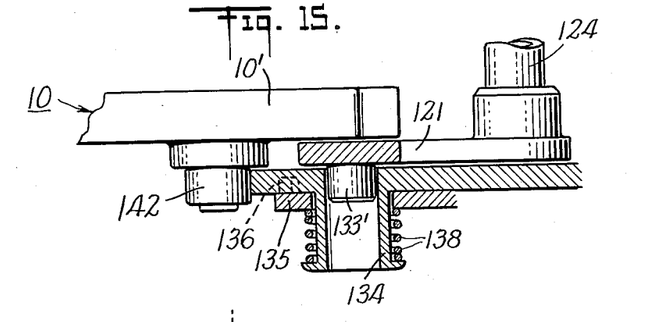
Fig. 15 is an enlarged plan sectional view, taken on line 15—15 of Fig. 4, showing parts operable by movement of the handle to effect engagement or disengagement of the wheel propulsion clutch.
Figure 16:
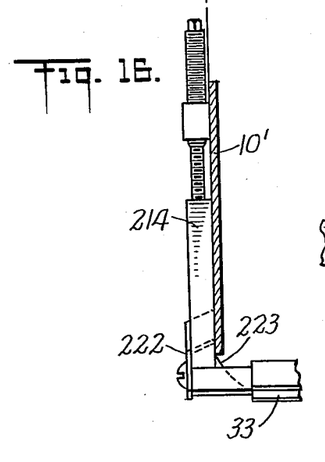
Fig. 16 is a section on line 16—16 of Fig. 4, showing the adjustment features of the bed knife and the grass guard associated therewith.

The tines 57 (please see Figures 1, 4, 5, 6 and 18) of the forked handle 56 are adapted to be sprung apart and a hollow bearing stud 134, as shown in Figure 15, in each is fitted onto a pivot pin 133' on each of the levers 121. The hollow bearing stud 134 which projects outwardly from handle 56 serves both as its bearing on pin 133' and to carry pivotally mounted thereon a detent 135 and spring 138. The detent 135 can be turned and locked in either one of two alternative positions, and it carries means for locking it in position including a projection 136, adapted to engage the edge of a portion of the handle at one side or the other of end member 133. To move from one of these positions to the other, detent 135 must be pulled out far enough to allow its flange 141, but not the projection 136, to clear the end of the handle; and, when the detent is released, spring 138 presses it back against the end of the handle with the projection 136 and the flange 141 in position to stop rotation of detent 135 with respect to the handle fork 57. Thus, the projection 136 and flange 141 comprise means for locking the detent 135 in either position on the handle. A flange on the outer end of stud 134 serves as an abutment for spring 138.

The detent 135 has a finger 140 flanged, as best shown at 141 in Fig. 18, to overlie the edge of the handle tine 57 or the lower edge of the cam 133 in its respective positions, with the end of the finger reaching beyond the end face of the cam. If detent 135 is pulled out to fully compress spring 138, the flange 141 will be free to pass over end member 133, but the projection 136 then serves as a limit stop to position the detent relative to cam 133 as shown in Fig. 5, then turned clockwise to its limit, and as shown in Fig. 5a when turned counterclockwise to its limit with flange 141 on the lower side of 133. As shown in Fig. 5a, the finger 140 will engage a projection in the mower, shown as a roller 142 at about the normal operating position of the handle. Further lifting of the handle will then lift the frame and with it the bed knife and ground roll. Thus, for example, the bed knife can be lifted over a stone, or held high when cutting over an uneven grade, as with one wheel on a sidewalk or over a garden.

When the finger is in the position shown in Fig. 5 and the handle is in the lifted position, as shown in full lines in Fig. 5, the finger will rest upon the cam roller 142. This will limit forward swing of the handle to a "parked" position with the handle vertical and just beyond top dead center. In swinging to this "parked" position, the action of cam 133 against the projection roller 142 will serve to swing lever 121 to a rearward position, pulling link 110 and thus effecting disengagement of the propulsion clutch 40 to stop driving the ground wheels. In case the operator of the machine drops the handle, instead of pushing it upright, that brings it to the broken line position of Fig. 5, and the handle then abuts against the bumper 129 swinging back 121 to produce the same result of disconnecting the propulsion clutch 40.

With the mower handle in the operating position, as in Figs. 1 and 4, the propulsion-clutch spring 103 (Figs. 4 and 9) tends to rotate sleeve 95 and swing arm 96 so as to pull the handle 56 forward. So long as the operator holds the handle at a proper height and does not pull back on it, the mower will drive forward. If the operator actually pushes forward on the handle, his force is added to the force of spring 103 to hold the clutch in engagement. Ordinarily this is not necessary, but it may be helpful in climbing a grade, as on a terrace, etc. Permitting the handle 56 thus to go forward will swing the levers 121 to the position of Fig. 4, thus advancing the link 110 and pushing the short lever 96 along the slot 98 in the sleeve 100, until the clutch engages gear 48 to cause forward rotation of shaft 39 and driving of the wheels.

If the drive is too fast, or if the operator decides to stop or slow down, a pull on the handle will move levers 121 to the position shown in Fig. 5, thus pulling link 110 and moving lever 96 in the opposite direction along cam slot 98 to disengage clutch 40.

From the above, it will be understood that the mower may be operated and declutched by merely holding the handle up or by direct push and pull on the mower handle or, alternatively, by cam action of the mower handle when it is lifted to its vertical position of rest just forward of dead center, or dropped to its horizontal position, i.e., the motor is automatically disengaged from the ground wheels when the handle is raised or lowered beyond the operating position and is automatically engaged when the handle is lifted (without pull) to an operating level.

As stated above, the motor 18 drives the reel 30 through a reducing gear 46, and a reel-driving clutch 50, somewhat similar to the propulsion clutch 40, except that, supplementing a friction disc, the clutch 50 has spring-engaged cam dogs and also has an automatic lockout release, so that the reel may be driven through heavy grass or into sticks, stones, etc., and yield before the mower is overloaded.

Now referring to Figs. 6, 7, 8 and 10, the countershaft 47 will be seen to be mounted at its two ends in ball bearings 150 and 151 supported by frame members 10. Between said bearings is a third ball bearing 152 serving as thrust bearing for the clutch.

Figure 6:
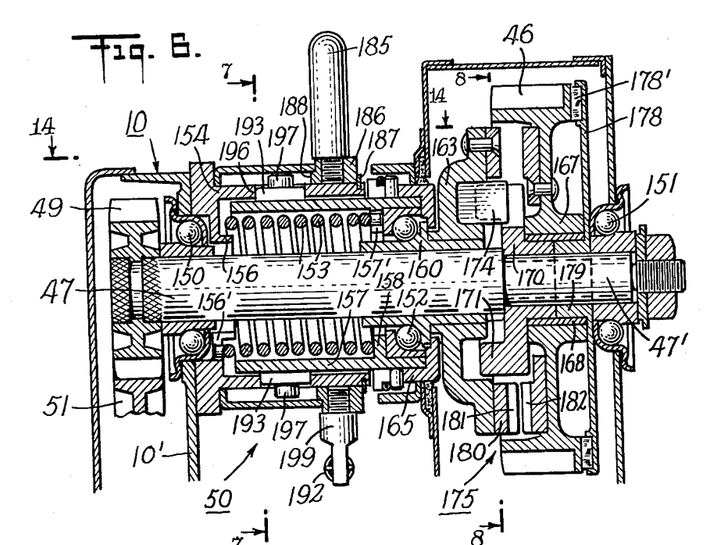
Fig. 6 is a sectional view shown on enlarged scale, the section being taken through the counter shaft clutch that transmits motor rotation to the reel, taken on line 6—6 of Fig. 4.

The left end of shaft 47 carries the gear pinion 49 of the reel drive gear train.

To the right of the bearing 150 is an outer sleeve 154 with an inturned flange 156. This sleeve is rigidly secured to frame 10. Flange 156 serves as an abutment, both for compression and torsion, of the coil spring 153, the end of which is bent over and engaged in slot 156'. The right end of sleeve 154 is open to receive the spring and the open end of an inner sleeve 157 telescoped therein and rotatably movable within the outer sleeve and also slidable lengthwise. An inturned flange 158 on sleeve 157, spaced a little from the right end, engages the other end of the spring 153 in slot 157'. This flange also abuts the inner member 160 of thrust bearing 152. A cap 165 is spring clipped onto the right end of sleeve 157 in the same way the cap 116 is attached to the sleeve 95 of the clutch 40.

Figure 8:
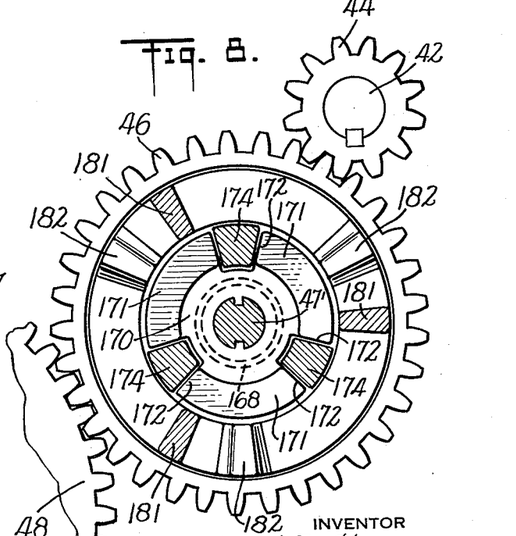
Fig. 8 is a cross-section taken on line 8—8 of Fig. 6 showing the motor drive pinion in engagement with the countershaft gear which cooperates with the clutch.

For details of the clutch gear 46, see Figs. 6, 8 and 10. The gear comprises a hub 167, having a bushed central opening 168, rotatably mounted on the adjoining hubs of a driven friction disc 178 having an internally splined hub 179 and dog clutch member 170. The member 170 is provided with spaced sector projections 171 having radial edges 172 engageable with an equal number of sector projections 174, on a driven clutch member 163. The hub portion of the member 170 is keyed to shaft 47 but is freely rotatable in the bushed opening 168 in the gear hub 167.

Gear hub 167 has sufficient axial play on the adjoining hubs 170, 179 to allow it to free itself from the friction facing 178' on disc 178. The bores of members 170, 179 fit the reduced end 47' of the shaft 47 and are splined or otherwise keyed therewith in a manner to cause rotation of the shaft when the driven member 163 and the gear 46 are in driving engagement through the clutch 175.

Now returning to the clutch member 163, it will be seen that on its lateral surface it is provided with a hard facing 180 formed with a plurality of cam teeth 181 which, when the clutch part has been pushed to the right, will engage with corresponding lateral cam teeth 182 on the gear. When the clutch is engaged under spring pressure, the sloping portions of these teeth 180 and 182 will engage and the shaft 47 will be rotated by rotation of the gear 46. However, upon any strong interference with the turning of the reel, the teeth ride up on one another, camming the clutch member away from the gear. This, as described below, releases the clutch coupling, so that there is no longer drive of the countershaft although the gear 46 continues to turn the propulsion shaft gear 49.

Figure 14:
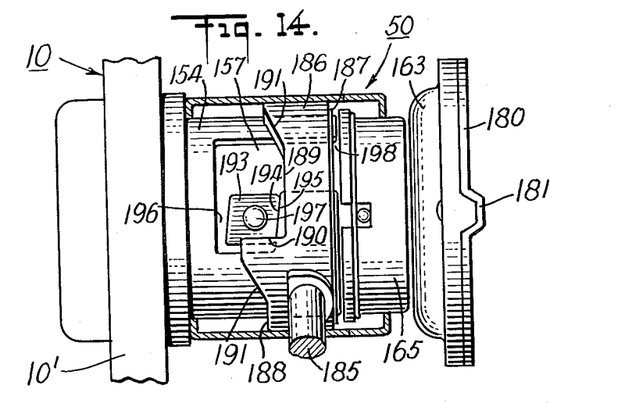
Fig. 14 is a plan view, with the casing in section, of the countershaft clutch, taken on line 14—14 of Fig. 6.

The means for effecting engagement and release of the clutch 50 comprises a hand lever 185 extending upwardly from a collar 186 (Figs. 6, 7, 10 and 14) which surrounds the outer sleeve 154 and is rotatable thereon. The collar is prevented from endwise movement to the right along the sleeve because of retaining means 187, but is freely movable to the left unless otherwise prevented. Extending to the left from the collar is a camming flange 188 (Fig. 14) cut away at opposite sides as at 189, leaving a longitudinal edge 190 and a sloping cam edge 191, the low point of cam 191 being spaced circumferentially from the shoulder 190. A lug 193 projecting outwardly from each side of the inner sleeve 157, is formed, as shown in Fig. 14, with a cam face 194, having the same slope as the cooperating edge 195 of a bayonet slot 196 in the sleeve 154. A pin 197 projecting from each lug 193 is engageable with the shoulder 190 and with the cam edge 191 of the collar.

In Fig. 14, the inner sleeve and its lug 193 are in the clutch disengaged position. Now, if the clutch lever 185 is pushed forward by the operator, i.e., toward the front of the machine, the shoulder 190 will engage the pin 197 and force lug 193 along the slot 196 until the lug clears the right hand edge and drops into the longitudinal leg 198 of the slot. Then immediately the sleeve 157 will be thrown to the right, by action of the clutch spring 153. This action will engage dog clutch 175 to drive shaft 47 from the gear 46.

To release the clutch manually, the hand lever 185 is pulled backward. This will cause the cam edge 191 to engage pin 197 which is now held by spring 153 against collar 186 at the base of shoulder 190. As the hand lever is pulled further back, the pin 197 is cammed to the left until lug 193 clears the end of leg 198 of slot 196 and passes onto the sloping edge 195 of the bayonet slot. The torsion stress of spring 153 then rotates sleeve 157, with consequent locking of the clutch in disengaged position.

Now going back to the position of the parts after clutch engagement (i.e., with lug 193 at the right end of slot 198, sleeve 157 also being in its right hand position and the cam teeth or dogs 181 and 182 of the clutch and gear being in operative engagement) and with the mower reel in operation, we may consider the safety function of the clutch by which injury to the knives or other parts of the machine is avoided. If a stick or other tough object enters between the fly knife and the bed knife, the shaft 47 may be stopped while the gear 46 continues to be turned by the motor. Under such conditions, something must give. In the structure shown, it will be the dog clutch 175. The camming of teeth 181 and 182 causes them to ride over each other and thus drive sleeve 157 to the left until lug 193 passes the corner of slot 198 and snaps into slot 196 where it will be held until released by a push of the hand lever 185.

Figure 7:
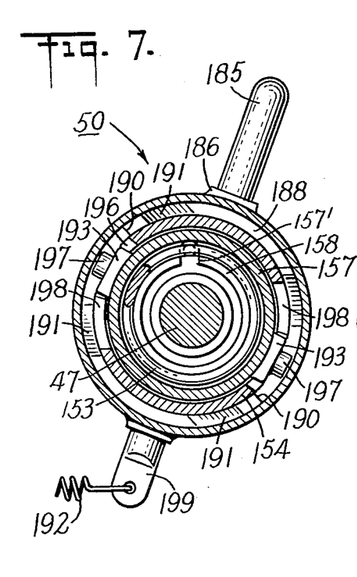
Fig. 7 is a clutch cross-section taken on line 7—7 of Fig. 6.

The normal neutral position of the hand lever 185 and its collar 186 is held resiliently by a spring 192 extending between an arm 199, projecting downward from the lower side of the collar 186 and a finger 200 on the fixed sleeve 100 of clutch 40 (see Figs. 7, 9 and 18).

Referring back to the friction disc 178, it is to be noted that a disc of friction material 178' is supported thereon so as to come into frictional engagement with the rim portion of gear 46. This contact tends to bring the gear and clutch member 163 to synchronism to assure meshing engagement.

Figure 3:
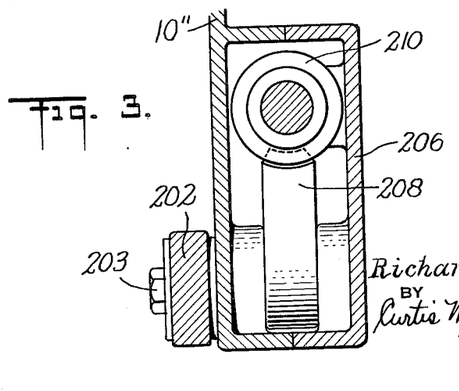
Fig. 3 is a section taken on line 3—3 of Fig. 2; but with the sector gear and its bearings shown in elevation.

The adjustment for height of cut in the device here shown (see Figs. 1, 2 and 3) comprises a pair of arms 202 keyed together so as to move together, in this instance, through the ground roller shaft 204. Each arm is pivoted, as at 203, on the frame. On one side of the mower, at its lower rear corner, is a gear box 206, as shown in Figs. 1-3, housing a gear segment 208 and a cooperating worm 210. As shown, the worm is manipulated by means of a winged handle 209, to lift or lower the roller shaft 204 by swinging the arms 202. Thus, a single adjusting member 209 at one side of the machine, operates both ends of the roller shaft. This arrangement thus insures precision height adjustment without the use of tools.

Figure 17:
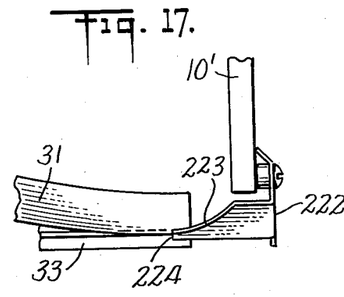
Fig. 17 is a front elevation of the same portion as is shown in Fig. 16.

Tall grass standing at the edge of a cutting always has caused trouble by winding up tightly on the reel shaft. The present invention avoids this difficulty by use of a curved shoe which deflects such tall grass inwardly away from the side walls of the frame and across the cutting edge of the bed knife. Thus it is either sheared or bent down beneath the bed knife, and is prevented from winding around the reel shaft. As shown in Fig. 17, each of the bed knife supporting members 214 carries a flanged shoe 222, the bottom of which extends below the bed knife and has an edge 223, which as shown in Fig. 17, curves inwardly to the edge 224 underlying an end portion of the bed knife 33.

From the above description, it will be seen the operation of the mower is controlled entirely by movements of the handle, the same in character as the same movements required with the hand mower, but with no need actually to push or drive the mower by hand pressure. Thus, when the handle is moved forward, it engages the propulsion clutch 40 and the mower moves forward to its work under power of the motor and without affecting operation of the reel, whether or not the reel-driving clutch 50 has connected the reel to the motor drive. When the handle is held back, the mower stops. And when the handle is swung to one side, to make a turn, the outside wheel rolls freely ahead by virtue of the over-running clutch in its drive pinion, and if the drive on the inside wheel (nearest the center of turning) tends to hurry the mower around the turn, the pull thus exerted against the operator, swings lever 121 to its clutch-disengaging position, keeping pace with the operator. Thus the mower turns to one side or the other without the necessity of the operator struggling with or racing to keep up with the mower. Thus it is possible with this mower, because of the fact that the turning is only over-running one wheel, to swing the mower around corners by a one-handed operation, and with very little effort, merely walking beside it and pushing the handle out away from the body or pulling it toward, or across in front of, one's body.

An important advantage of this clutching arrangement of the wheel propulsion shaft is that, when the motor is shut off, the machine can be pulled or pushed free of any drag from motor or reel. Pulling the mower back by hand releases the propulsion clutch 40 so that the wheels run free, whereas pushing the mower forward by hand causes the drive pinions to overrun the shaft 39 by virtue of the shuttle pin clutches 74, so that again the wheels run free. Thus, without conscious disengagement, the mower can always be pushed around to any position whether or not the motor is running, and without dragging the wheels.

With the novel handle controlled propulsion clutching and independent reel drive of this or the copending application, one can cut through the heaviest stand of grass by merely moving the mower slowly through it. One may, however, dispense with this independent reel drive and apply the propulsion unit, including the motor 18, drive gears 42, 46 and 48, drive shaft 39, clutch 40, overrunning clutches 79 and pinions 78, to a standard hand mower with reel driven directly from the wheel gear 80 through the usual shuttle pin clutch. This has the advantage that if one runs out of gas, or does not want to bother with the motor for small trimming jobs, the mower can always be used like any ordinary hand mower.

In this specification and the accompanying drawings I have shown and described a preferred embodiment of my invention and various modifications thereof; but it is to be understood that these are not intended to be exhaustive or limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

I claim:

1. A power-driven lawn mower providing easy manual control of the speed by actuation of the mower handle and wherein the operator is enabled to accomplish control over the speed without removing his hands from the mower handle, comprising a mower frame, a pair of ground-engaging drive wheels on said frame, one at each side thereof, a propulsion shaft rotatably mounted on said frame and extending across said frame and drivingly connected to said wheels, a motor mounted on said frame, a propulsion clutch comprising first and second frictionally engageable clutch members, said first clutch member being rotatably mounted concentric with said propulsion shaft and being driven by said motor and said second clutch member being splined to said shaft for axial movement toward and away from said first clutch member, spring means urging said second clutch member axially toward said first clutch member, an inner and an outer sleeve concentric with said propulsion shaft and relatively rotatable, one of said sleeves having a spiral cam slot and the other having a cam boss engaging in said slot, one of said sleeves being axially movable in response to relative movement of said cam boss along said spiral cam slot and being connected to said second clutch member for controlling the axial movement of said second clutch member, a clutch-operating lever connected to one of said sleeves for producing relative rotation between said sleeves, said lever being movable in a first direction to produce said relative rotation to move said second clutch member away from said first clutch member against the action of said spring means and being movable in a second direction opposite to said first direction for aiding the action of said spring means to move said second clutch member toward said first clutch member, a mower handle, a pair of swing links near opposite sides of the frame, a pair of pivots connecting said swing links to the frame, said swing links extending generally vertically and being pivotally connected to the lower end of the mower handle for accommodating forward and backward movement of the mower handle with respect to the mower frame, and linkage means connecting said swing levers to said clutch operating lever for moving said clutch-operating lever in its second direction upon backward movement of the swing levers, and vice versa.

2. A power-driven lawn mower providing easy manual control of the speed from the mower handle and wherein the operator is enabled to accomplish control over the speed without removing his hands from the mower handle and wherein the power-drive is automatically disengaged when the mower handle is swung to its upright parking position, comprising a mower frame, a pair of ground-engaging drive wheels on said frame, one at each side thereof, a propulsion shaft rotatably mounted on said frame and extending across said frame and drivingly connected to said wheels, a motor mounted on said frame, a propulsion clutch comprising first and second frictionally engageable clutch members, said first clutch member being rotatably mounted concentric with said propulsion shaft and being connected in driving relationship with said motor, and said second clutch member being splined to said shaft for axial movement toward and away from said first clutch member, spring means urging said second clutch member axially toward said first clutch member, an inner and an outer sleeve concentric with said propulsion shaft and relatively rotatable, one of said sleeves having a spiral cam slot and the other having a cam boss engaging in said slot, one of said sleeves being axially movable in response to relative movement of said cam boss along said spiral cam slot and being connected to said second clutch member for controlling the axial movement of said second clutch member, a clutch-operating lever connected to one of said sleeves for producing relative rotation between said sleeves, said lever being movable in a first direction to produce said relative rotation to move said second clutch member away from said first clutch member against the action of said spring means and being movable in a second direction opposite to said first direction for aiding the action of said spring means to move said second clutch member toward said first clutch member, a mower handle, a pair of swing links near opposite sides of the frame, a first pair of pivots connecting said swing links to the frame, said swing links extending generally vertically, a second pair of pivots connecting the lower end of the mower handle to said swing links for accommodating forward and backward movement of the mower handle with respect to the mower frame, and linkage means connecting said swing levers to said clutch operating lever for moving said clutch-operating lever in its first direction upon forward movement of the swing levers, and vice versa, said handle being swingable about said second pair of pivots into a vertical parking position just beyond top dead center, a forwardly protruding cam surface on said handle near one of said second pair of pivots, a projection on the mower ahead of said cam surface and engaged by said cam surface when the handle is in its parking position for moving the swing lever rearwardly, thereby automatically to disengage the clutch members.

3. A power-driven lawn mower providing easy manual control of the speed by actuation of the mower handle and wherein the operator is enabled to accomplish control over the speed without removing his hands from the mower handle and wherein release of the mower handle disengages the power drive comprising a mower frame, a pair of ground-engaging drive wheels on said frame, one at each side thereof, a shaft rotatably mounted on said frame and drivingly connected to said wheels, a motor mounted on said frame, a propulsion clutch comprising first and second concentrically rotatable frictionally engageable clutch members, said first clutch member being driven by said motor and said second clutch member being splined to said shaft for axial movement toward and away from said first clutch member, spring means urging said second clutch member axially toward said first clutch member, an inner and an outer sleeve concentric with said clutch members and being relatively rotatable, one of said sleeves having a spiral cam slot and the other having a cam boss engaging in said slot, one of said sleeves being axially movable in response to relative movement of said cam boss along said spiral cam slot and being connected to said second clutch member for controlling the axial movement of said second clutch member, a clutch-operating lever connected to one of said sleeves for producing relative rotation between said sleeves, said lever being movable in a first direction to produce said relative rotation to move said second clutch member away from said first clutch member against the action of said spring means and being movable in a second direction opposite to said first direction for aiding the action of said spring means to move said second clutch member toward said first clutch member, a mower handle, a pair of swing links near opposite sides of the frame, a pair of pivots connecting said swing links to the frame, said swing links extending generally vertically and a second pair of pivots connecting the lower end of said mower handle to said swing links for accommodating forward and backward movement of the mower handle with respect to the mower frame, and linkage means connecting said swing levers to said clutch operating lever for moving said clutch-operating lever in its first direction upon forward movement of the swing levers, and vice versa, one of said swing levers having a rearward extension which engages the mower handle when the handle is manually released for swinging the swing lever backward upon engagement with the released handle.

4. A power-driven lawn mower providing easy manual control of the speed from the mower handle and wherein the operator is enabled to accomplish control over the speed without removing his hands from the mower handle comprising a mower frame, a pair of ground-engaging drive wheels on said frame, one at each side thereof, a shaft rotatably mounted on said frame and in positive driving relationship with said wheels, a motor mounted on said frame, a propulsion clutch comprising first and second concentrically rotatable frictionally engageable clutch members, said first clutch member being driven by said motor and said second clutch member being splined to said shaft for axial movement toward and away from said first clutch member, spring means urging said second clutch member axially toward said first clutch member, an inner and an outer sleeve concentric with said clutch members and relatively rotatable, one of said sleeves having a spiral cam slot and the other having a cam boss engaging in said slot, one of said sleeves being axially movable in response to relative movement of said cam boss along said spiral cam slot and controlling the axial movement of said second clutch member, a clutch-operating lever connected to one of said sleeves for producing relative rotation between said sleeves, said lever being movable in a first direction to produce said relative rotation for opposing the action of said spring means to move said second clutch member away from said first clutch member and being movable in a second direction opposite to said first direction for aiding the action of said spring means to move said second clutch member toward said first clutch member, a lower handle, a pair of swing links near opposite sides of the frame, a pair of pivots connecting said swing links to the frame, said swing links extending generally vertically, a strut connecting the upper ends of said swing links, said mower handle having a pair of tines at its lower end, and a second pair of pivots pivotally connecting the lower portions of said tines respectively to said swing links for accommodating forward and backward movement of the mower handle with respect to the mower frame, and linkage means connecting said swing levers to said clutch operating lever for moving said clutch-operating lever in its first direction upon forward movement of the swing levers, and vice versa.

5. A power-driven lawn mower providing easy manual control of both speed and direction from the mower handle, said control being accomplished by means of the type of movements normally imparted to the mower handle of a hand-operated mower during normal use and automatically disengaging the power drive when the operator pulls backwardly upon the mower handle enabling the mower to be pulled backwardly readily by hand, comprising a mower frame, a pair of ground wheels on said frame, one at each side thereof, a propulsion shaft rotatably mounted on said frame and extending across said frame from one side to the other thereof, a pair of over-running clutches, each of said clutches drivingly connecting said propulsion shaft to a respective one of said ground wheels for applying driving power from the propulsion shaft to the wheels, a driving motor on said frame, a propulsion clutch including a pair of relatively movable, frictionally engageable clutch members, spring means urging said clutch members towards forceful, frictional engagement, one of said clutch members being driven by said motor, the other of said clutch members being in positive driving engagement with said propulsion shaft, a clutch-operating lever interconnected with one of said clutch members, said clutch-operating lever being movable in a first direction and moving said one clutch member away from said other clutch member against the action of said spring means, said clutch-operating lever being movable in a second direction opposite to said first direction and moving said one clutch member toward said other clutch member, a mower handle, a pair of swing levers near opposite sides of the frame, a pair of pivot connections connecting said swing levers respectively to the frame, said swing levers extending generally vertically from their respective pivot connections, said mower handle being pivotally connected at its lower end to each of said swing levers, said handle being movable backwardly and forwardly with respect to said frame and swinging said swing levers backwardly and forwardly, linkage means connecting said swing levers to said clutch-operating lever for moving said clutch-operating lever in said first direction when said handle is moved backwardly and for moving said clutch-operating lever in said second direction when said handle is moved forwardly, whereby the driving force from the motor to the propulsion shaft is diminished as the operator pulls backwardly upon the handle and is increased as the operator pushes forwardly upon the handle and said over-running clutches enable the mower to be readily steered from the mower handle.

References Cited in the file of this patent

UNITED STATES PATENTS

| 1,947,117 | Stegeman et al. | Feb. 13, 1934 |
| 2,055,724 | Irgens | Sept. 29, 1936 |
| 2,151,659 | Funk | Mar. 21, 1939 |
| 2,220,705 | Burckes | Nov. 5, 1940 |
| 2,401,611 | Carlson | June 4, 1946 |
| 2,429,378 | Stuebner | Oct. 21, 1947 |
| 2,453,819 | Smith | Nov. 16, 1948 |
| 2,519,270 | Miller | Aug. 15, 1950 |
| 2,557,897 | Sullivan | June 19, 1951 |
| 2,571,669 | Boyce et al. | Oct. 16, 1951 |
| 2,636,332 | Cole | Apr. 28, 1953 |
| 2,658,322 | Sullivan | Nov. 10, 1953 |
| 2,667,026 | Ingram | Jan. 26, 1954 |
| 2,707,362 | Thelander | May 3, 1955 |